(12) United States Patent
Wang et al.

(10) Patent No.: US 12,106,787 B1
(45) Date of Patent: Oct. 1, 2024

(54) DFL READ HEAD WITH SIOX CAP LAYER ON ALOX REFILL LAYERS

(71) Applicant: Western Digital Technologies, Inc., San Jose, CA (US)

(72) Inventors: Yung-Hung Wang, San Jose, CA (US); Chih-Ching Hu, Pleasanton, CA (US); Hongxue Liu, Fremont, CA (US); Guanxiong Li, Fremont, CA (US); Chen-Jung Chien, Mountain View, CA (US); Ming Mao, Dublin, CA (US); Ming Jiang, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/229,096

(22) Filed: Aug. 1, 2023

Related U.S. Application Data

(60) Provisional application No. 63/468,508, filed on May 23, 2023.

(51) Int. Cl.
*G11B 5/39* (2006.01)

(52) U.S. Cl.
CPC .................. *G11B 5/3932* (2013.01)

(58) Field of Classification Search
None
See application file for complete search history.

(56) References Cited

U.S. PATENT DOCUMENTS

| | | | |
|---|---|---|---|
| 6,609,948 B1 * | 8/2003 | Fontana, Jr. | B82Y 10/00 451/259 |
| 7,279,424 B2 | 10/2007 | Guthrie et al. | |
| 7,429,493 B2 | 9/2008 | Jiang et al. | |
| 9,087,527 B1 * | 7/2015 | Li | G11B 5/3958 |
| 9,147,404 B1 * | 9/2015 | Luo | G11B 5/398 |
| 9,280,992 B1 * | 3/2016 | Jiang | G11B 5/3932 |
| 9,513,349 B2 * | 12/2016 | Gill | G11B 5/3932 |
| 9,570,100 B1 * | 2/2017 | Freitag | G11B 5/3912 |
| 10,157,634 B2 | 12/2018 | Ding et al. | |
| 10,714,131 B1 * | 7/2020 | Wu | G11B 5/3906 |
| 10,755,733 B1 * | 8/2020 | Zheng | G11B 5/3929 |
| 10,777,222 B1 * | 9/2020 | Liu | G11B 5/3909 |
| 11,087,785 B1 * | 8/2021 | Mao | G11B 5/3909 |
| 11,170,808 B1 * | 11/2021 | Liu | G11B 5/3912 |
| 11,170,809 B1 * | 11/2021 | Mao | G11B 5/3909 |
| 11,514,933 B1 * | 11/2022 | Chien | G11B 5/3932 |

(Continued)

*Primary Examiner* — William J Klimowicz
(74) *Attorney, Agent, or Firm* — PATTERSON + SHERIDAN, LLP

(57) ABSTRACT

The present disclosure generally relate to a read head and methods of forming thereof. Upon forming a dual free layer (DFL) sensor and a rear hard bias (RHB) structure on a seed layer, a photoresist is deposited on the DFL read head and the RHB structure. A refill layer is deposited on the photoresist and the seed layer adjacent to the DFL sensor and the RHB structure. Portions of the refill layer disposed on one or more sidewalls of the photoresist are removed, and a SiOx cap layer is deposited on the refill layer and on the one or more sidewalls. The photoresist is removed, and the SiOx cap layer and top surfaces of the DFL sensor and the RHB structure are planarized to form a substantially flat topography. The SiOx cap layer acts as a stop layer for the refill layer, and remains in the finished read head.

19 Claims, 12 Drawing Sheets

(56) References Cited

U.S. PATENT DOCUMENTS

| | | | | |
|---|---|---|---|---|
| 11,514,934 | B1* | 11/2022 | Mao | G11B 5/3954 |
| 11,514,935 | B1* | 11/2022 | Liu | G11B 5/11 |
| 11,783,853 | B1* | 10/2023 | Liu | G11B 5/11 |
| | | | | 360/324.2 |
| 2002/0114111 | A1* | 8/2002 | Zhu | B82Y 25/00 |
| | | | | 360/324.1 |
| 2007/0019340 | A1* | 1/2007 | Gill | G11B 5/3932 |
| | | | | 360/324.11 |
| 2014/0153138 | A1* | 6/2014 | Le | G11B 5/11 |
| | | | | 360/294 |
| 2014/0293472 | A1* | 10/2014 | Balamane | G11B 5/398 |
| | | | | 216/22 |
| 2014/0340791 | A1* | 11/2014 | Braganca | G11B 5/398 |
| | | | | 360/234.4 |
| 2015/0154990 | A1* | 6/2015 | Jiang | G11B 5/3932 |
| | | | | 216/22 |
| 2017/0092303 | A1* | 3/2017 | Jiang | G11B 5/315 |
| 2017/0154641 | A1* | 6/2017 | Hao | G11B 5/3977 |
| 2017/0337941 | A1* | 11/2017 | Xiao | G11B 5/112 |
| 2019/0221232 | A1* | 7/2019 | Le | G11B 5/3932 |
| 2020/0176024 | A1* | 6/2020 | Quan | G11B 5/3951 |
| 2021/0390978 | A1 | 12/2021 | Hu et al. | |
| 2022/0115035 | A1* | 4/2022 | Mao | G11B 5/398 |

* cited by examiner

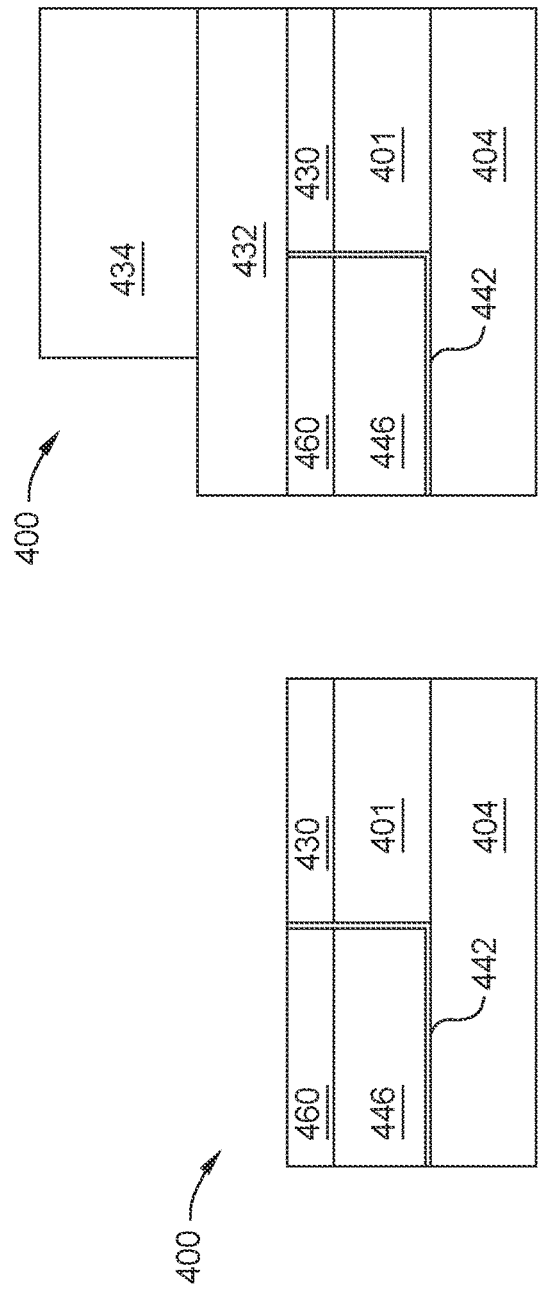
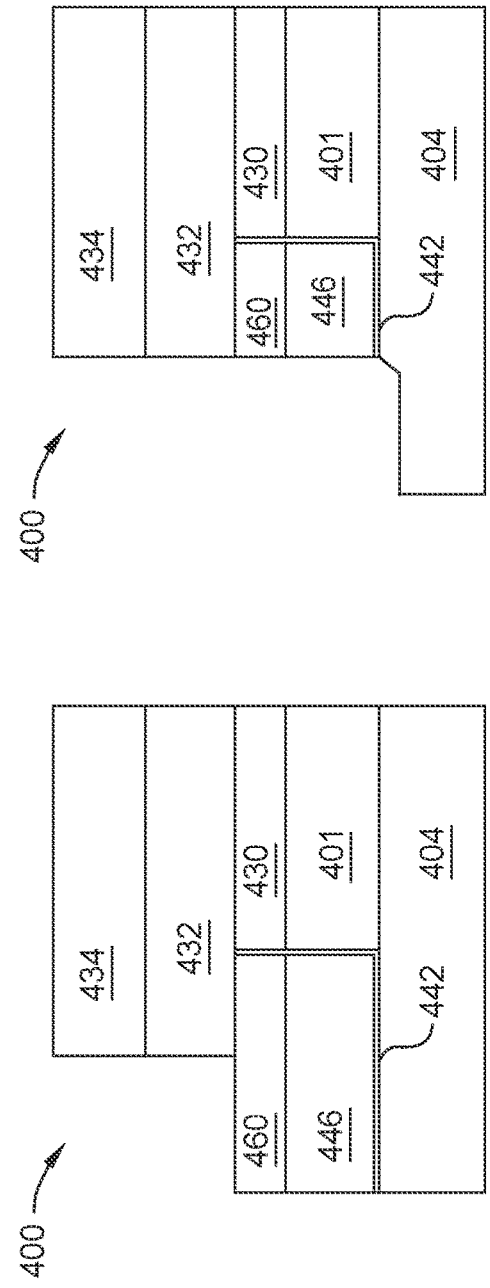

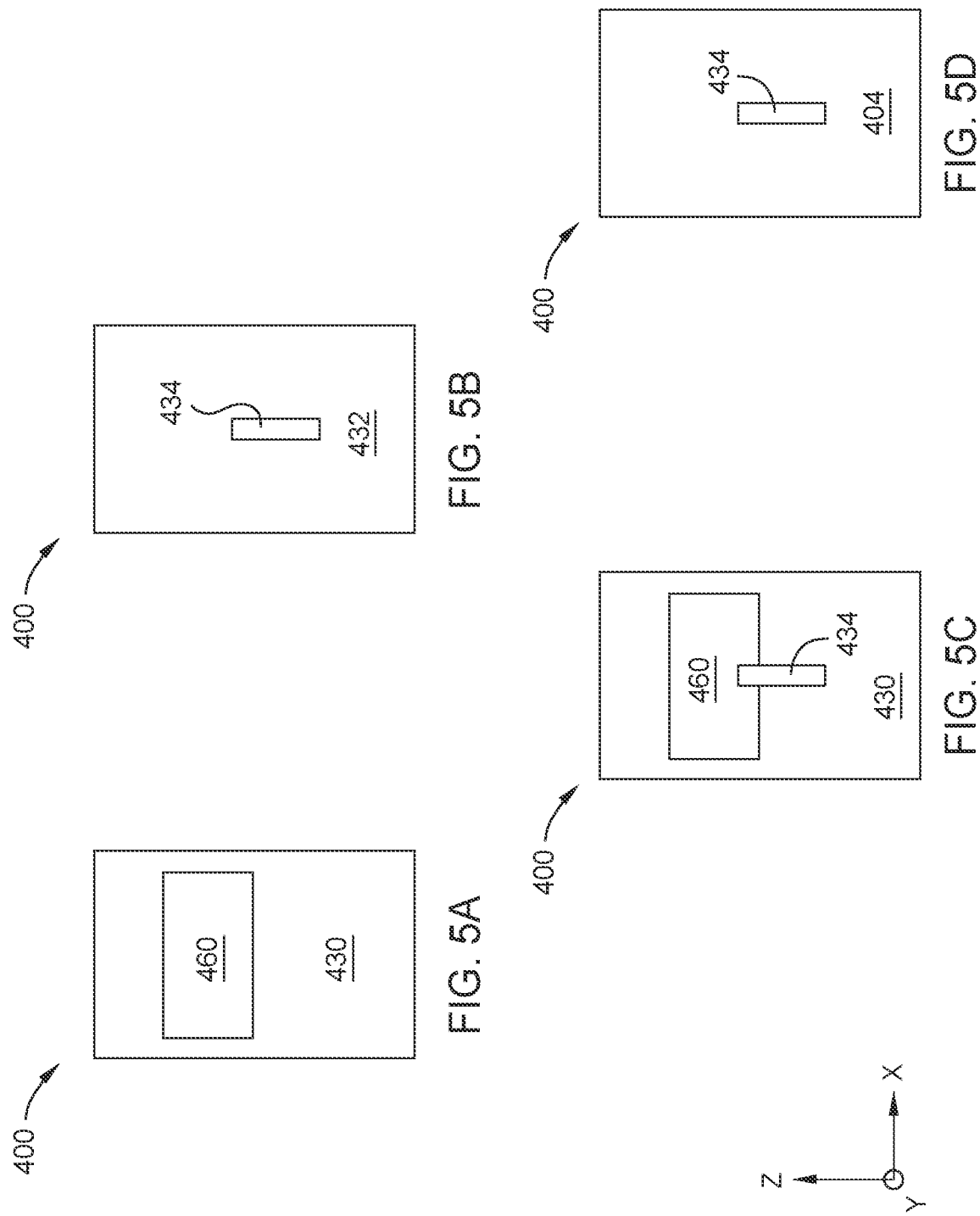

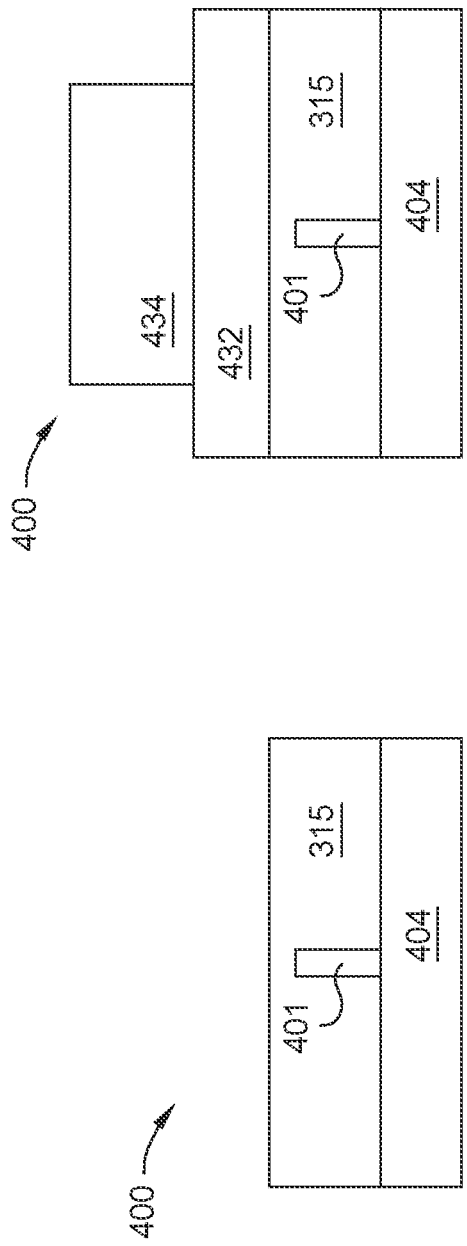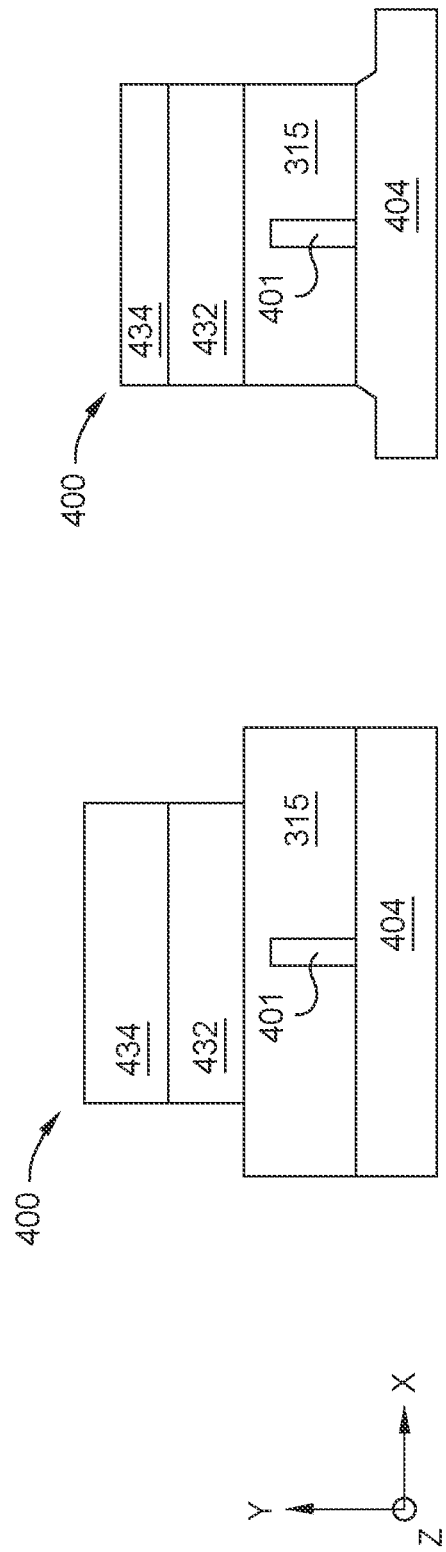

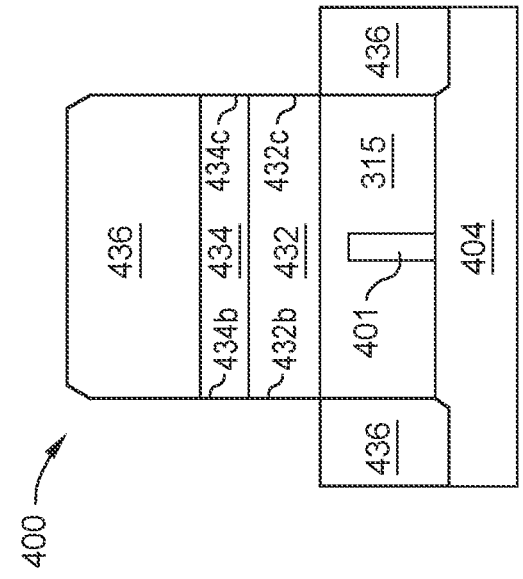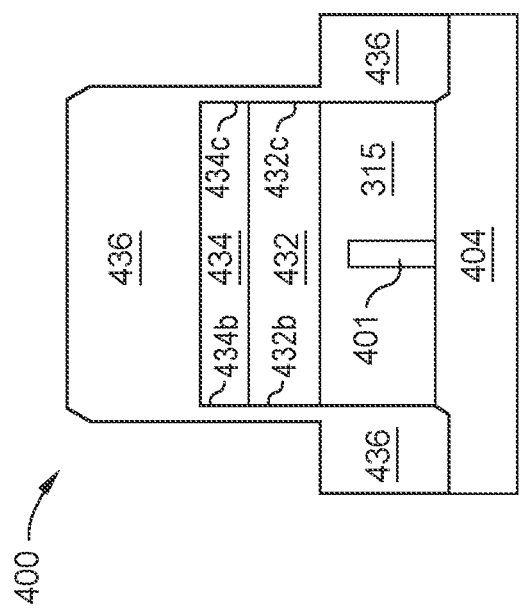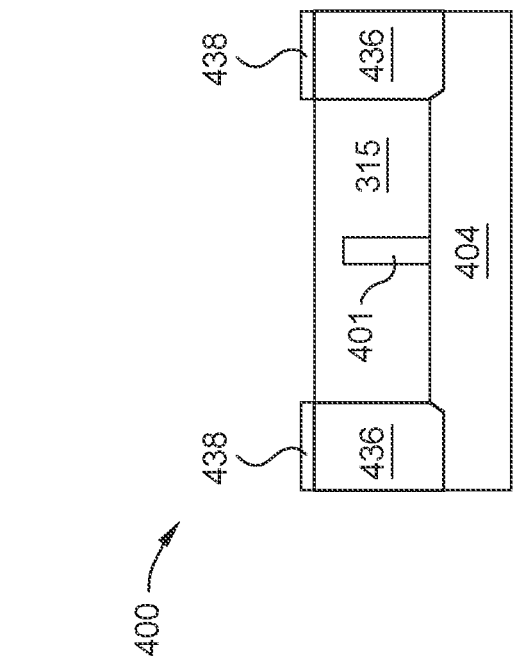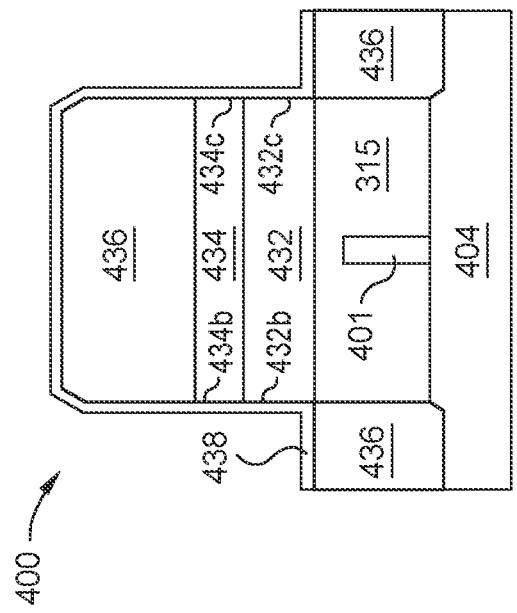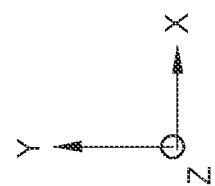

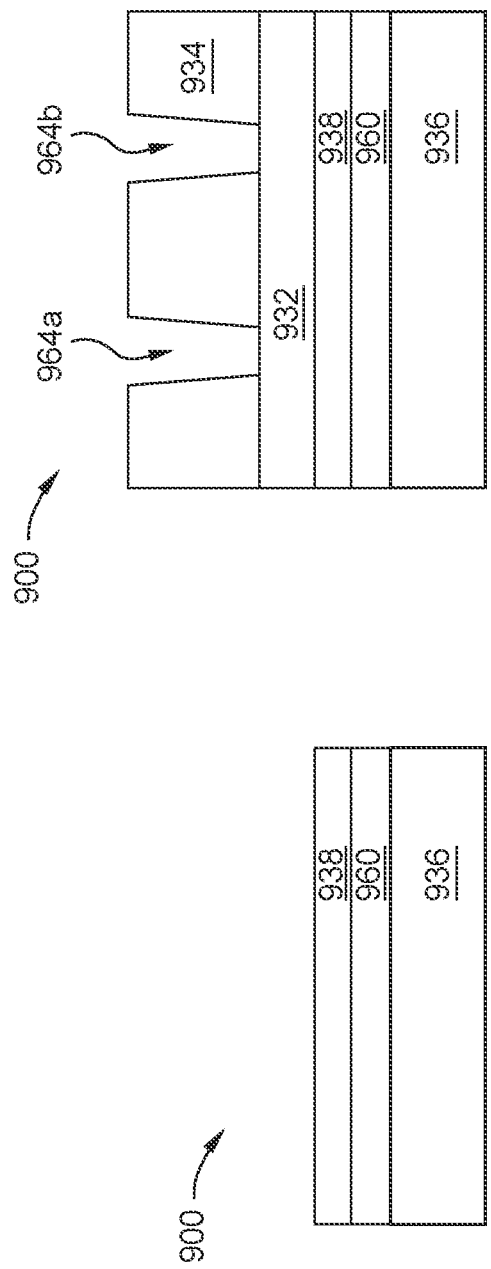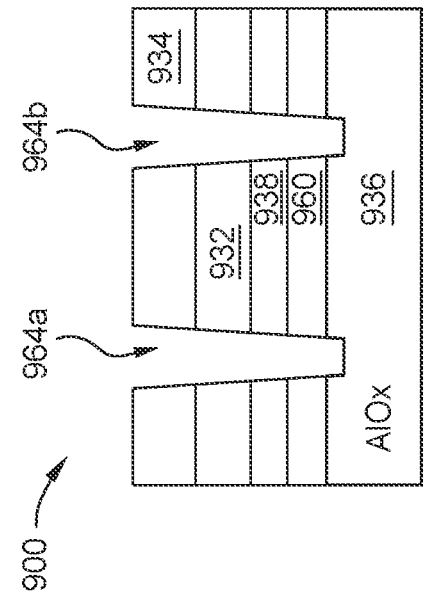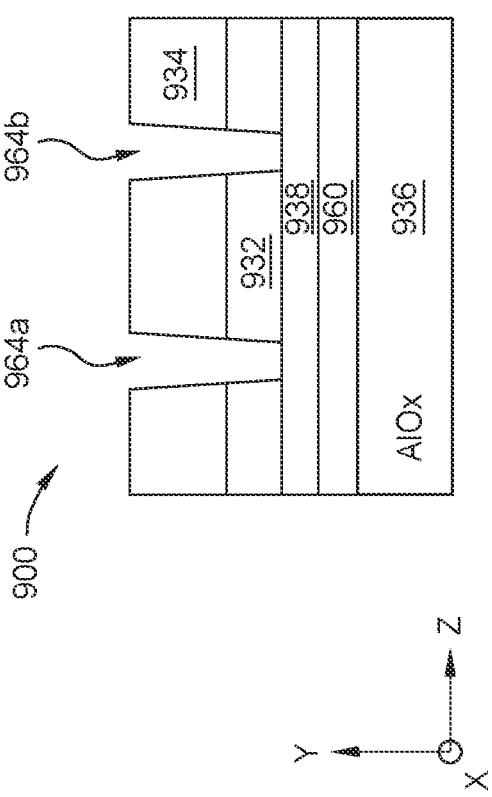

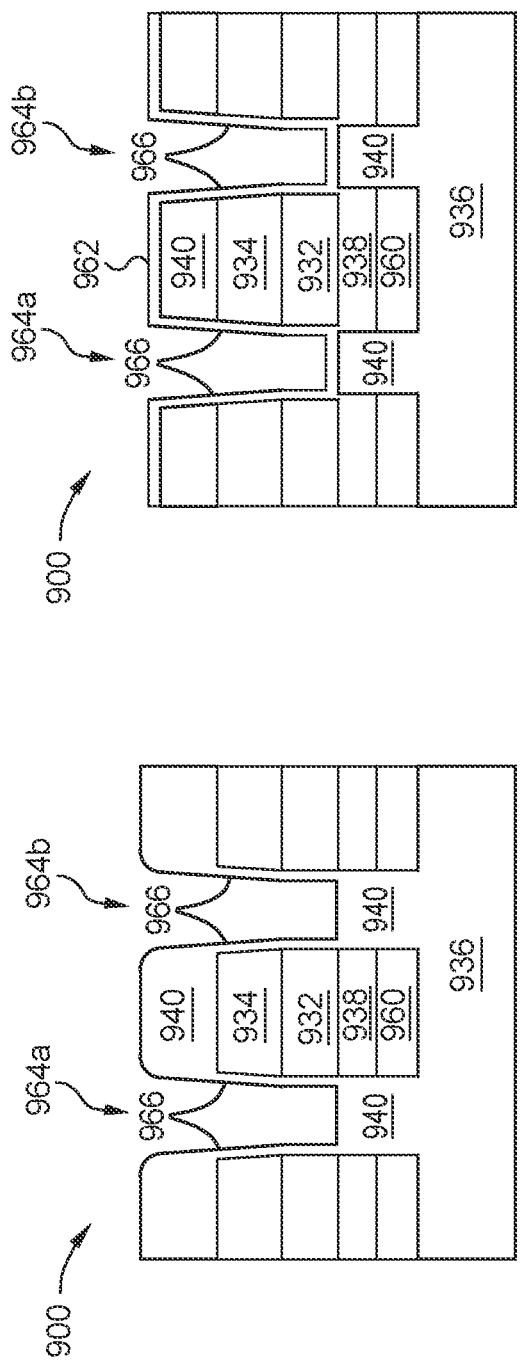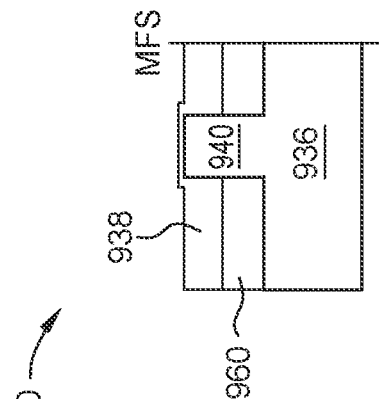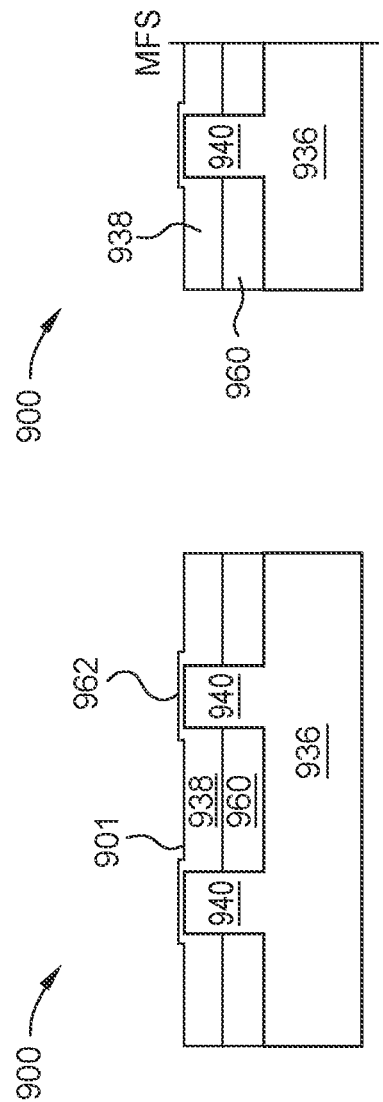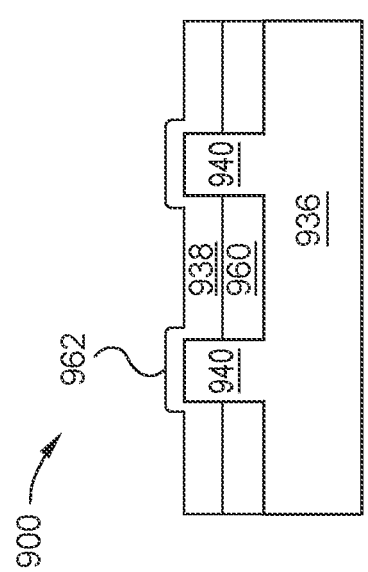

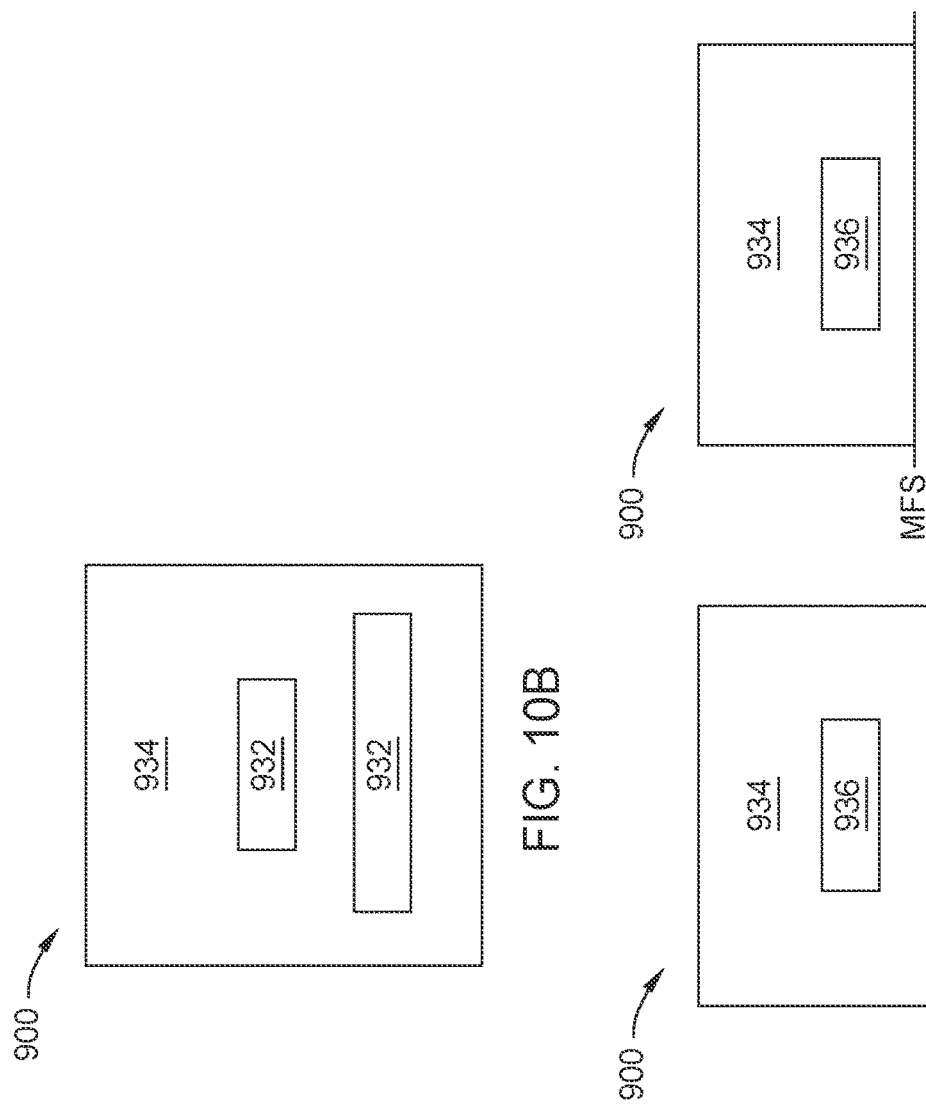

DFL READ HEAD WITH SIOX CAP LAYER ON ALOX REFILL LAYERS

CROSS-REFERENCE TO RELATED APPLICATIONS

This application claims benefit of U.S. provisional patent application Ser. No. 63/468,508, filed May 23, 2023, which is herein incorporated by reference.

BACKGROUND OF THE DISCLOSURE

Field of the Disclosure

Embodiments of the present disclosure generally relate to a dual free layer (DFL) read head and methods of forming thereof.

Description of the Related Art

Read heads, which are configured to read data from a media, generally comprise two free layers to be dual free layer (DFL) readers or sensors. In DFL reader operation, the two free layers are individually stabilized longitudinally by an anti-ferromagnetically coupled (AFC) soft bias (SB) and biased transversally by a permanent magnet or a rear hard bias (RHB) structure from the stripe back edge of the sensor. Recently, the track width of the DFL read heads has been decreasing. However, the smaller track width of the DFL read heads can limit performance of the DFL read heads, as the signal-to-noise ratio may degrade.

Moreover, a transverse bias field of DFL read heads is determined by the remnant magnetization (Mr) times thickness (t) product (i.e., Mr*t) of the RHB structure. Since a saturation magnetization, Ms, and thus, the Mr of the RHB is quite limited (e.g., as compared to the Ms of a read soft bias (RSB)), a thicker RHB is generally required to achieve the desired transverse bias field. However, the thicker RHBs may certainly result in a larger undesirable topography along the stripe direction, and in turn limit DFL readers for two dimensional magnetic recording (TDMR) applications. In addition, a large RHB comprising a granular material may result in an unintended read-out signal polarity flip due to the RHB biasing direction flip, further negatively impacting the overall performance and reliability of the DFL read heads. Furthermore, the granular nature of a large sized RHB certainly determines the transversal bias field with intrinsic non-uniformity and the limitation to read heads with smaller track widths for higher areal recording density due to significant performance degradations.

In the formation of the DFL reader, the RHB is often formed with a tantalum (Ta) cap layer. However, an insulating layer is often deposited adjacent to the RHB, and a Ta cap layer is often utilized as a planarization stop layer on the insulating layer to prevent the insulating layer from being removed. Since the RHB and the insulating layer both comprise a Ta cap layer, the cap layer of the insulating layer must be fully removed from the DFL read head to prevent the DFL read head from shorting out due to the Ta cap layer disposed on the RHB layer.

Therefore, there is a need in the art for an improved cap layer for the insulating layer.

SUMMARY OF THE DISCLOSURE

The present disclosure generally relate to a read head and methods of forming thereof. Upon forming a dual free layer (DFL) sensor and a rear hard bias (RHB) structure on a seed layer, a photoresist is deposited on the DFL read head and the RHB structure. A refill layer is deposited on the photoresist and the seed layer adjacent to the DFL sensor and the RHB structure. Portions of the refill layer disposed on one or more sidewalls of the photoresist are removed, and a silicon oxide (SiOx, where x is an integer greater than or equal to 1) cap layer is deposited on the refill layer and on the one or more sidewalls. The photoresist is removed, and the SiOx cap layer and top surfaces of the DFL sensor and the RHB structure are planarized to form a substantially flat topography. The SiOx cap layer acts as a stop layer for the refill layer, and remains in the finished read head.

In one embodiment, a read head comprises a dual free layer (DFL) sensor having a first surface disposed at a media facing surface (MFS), a second surface opposite the first surface, a third surface adjacent to the first surface, and a fourth side opposite the third surface, a rear hard bias (RHB) structure having a first surface disposed adjacent to the second surface of the DFL sensor, a second surface opposite the first surface, a third surface aligned with a third surface of the DFL sensor, and a fourth surface aligned with the fourth surface of the DFL sensor, a nonmagnetic layer disposed on the RHB structure, an insulating layer disposed around the second, third, and fourth surfaces of the RHB structure, and around the second and third surfaces of the DFL sensor, and a SiOx cap layer disposed on the insulating layer, where x is an integer greater than or equal to 1.

In another embodiment, a method of forming a read head comprises forming a dual free layer (DFL) sensor and a rear hard bias (RHB) structure on a seed layer, the DFL sensor being disposed at a media facing surface (MFS) and the RHB structure being recessed from the MFS, wherein the RHB structure comprises a nonmagnetic cap layer, depositing a photoresist on the DFL read head and the RHB structure, depositing a refill layer on the photoresist and on the seed layer adjacent to the DFL sensor and the RHB structure, the refill layer being deposited on one or more sidewalls of the photoresist, removing portions of the refill layer disposed on the one or more sidewalls, depositing a SiOx cap layer, where x is an integer greater than or equal to 1, on the refill layer and on the one or more sidewalls, removing the photoresist, and planarizing the SiOx cap layer and top surfaces of the DFL sensor and the RHB structure.

In yet another embodiment, a method of forming an electrical lapping guide adjacent to a read head comprises depositing a first insulating layer, depositing a metal layer on the first insulating layer, depositing a first SiOx cap layer, where x is an integer greater than or equal to 1, on the metal layer, depositing a photoresist on the first SiOx cap layer, creating one or more vias in the photoresist, removing portions of the first SiOx cap layer and the metal layer disposed in the one or more vias to expose one or more portions of the first insulating layer, depositing a second insulating layer on the photoresist and the exposed portions of the first insulating layer, the second insulating layer being deposited on sidewalls of the one or more vias, removing portions of the second insulating layer disposed on the sidewalls of the one or more vias, depositing a second SiOx layer, where x is an integer greater than or equal to 1, on the second insulating layer and on the sidewalls of the one or more vias, and removing the photoresist to expose the first SiOx cap layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4D illustrate cross-sectional views of various initial stages of a method of forming a DFL read head, in accordance with one or more embodiments of the present disclosure.

FIGS. 5A-5D illustrate top views of the various initial stages of a method of forming the DFL read head of FIGS. 4A-4D, in accordance with one or more embodiments of the present disclosure.

FIGS. 6A-6D illustrate media facing surface (MFS) views of the various initial stages of a method of forming the DFL read head of FIGS. 4A-5D, in accordance with one or more embodiments of the present disclosure.

FIGS. 8A-8D illustrate MFS views of various stages of the method of forming the DFL read head of FIGS. 7A-7D, in accordance with one or more embodiments of the present disclosure.

FIGS. 9A-9I illustrate cross-section views of various stages of the method of forming an electrical lapping guide (ELG) of a read/write head, in accordance with one or more embodiments of the present disclosure.

FIGS. 10A-10E illustrate top views of various stages of the method of forming the electrical lapping guide (ELG) corresponding to FIGS. 9A-9D and 9I, in accordance with one or more embodiments of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relate to a read head and methods of forming thereof. Upon forming a dual free layer (DFL) sensor and a rear hard bias (RHB) structure on a seed layer, a photoresist is deposited on the DFL read head and the RHB structure. A refill layer is deposited on the photoresist and the seed layer adjacent to the DFL sensor and the RHB structure. Portions of the refill layer disposed on one or more sidewalls of the photoresist are removed, and a SiOx cap layer (where x is an integer greater than or equal to 1) is deposited on the refill layer and on the one or more sidewalls. The photoresist is removed, and the SiOx cap layer and top surfaces of the DFL sensor and the RHB structure are planarized to form a substantially flat topography. The SiOx cap layer acts as a stop layer for the refill layer, and remains in the finished read head.

Figure 1:
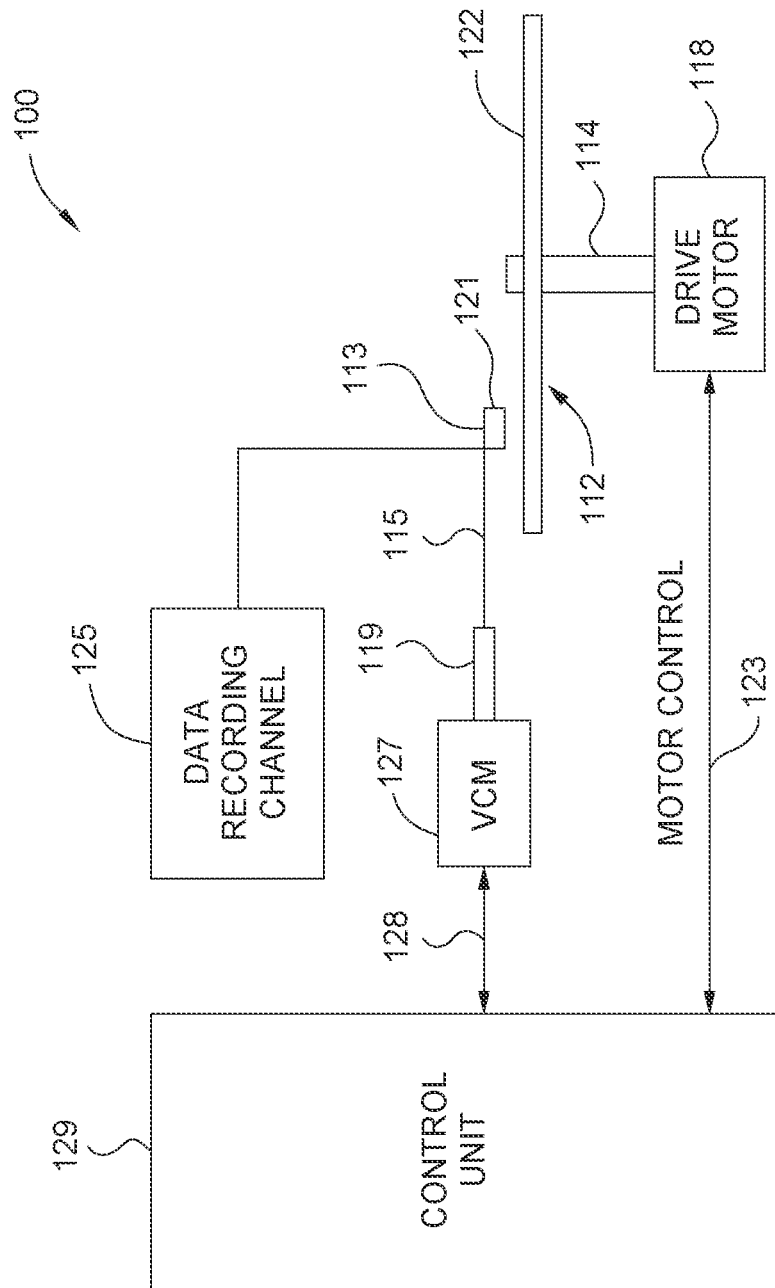
FIG. 1 illustrates a disk drive embodying this disclosure.

FIG. 1 illustrates a disk drive 100 embodying this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the media 112 surface by a small, substantially constant spacing during normal operation. In the case of EAMR, a DC magnetic field generated from an assist element of the magnetic head assembly 121 enhances the write-ability so that the write element of the magnetic head assembly 121 may efficiently magnetize the data bits in the media 112.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

It is to be understood that the embodiments discussed herein are applicable to a data storage device such as a hard disk drive (HDD) as well as a tape drive such as a tape embedded drive (TED) or an insertable tape media drive, such as those conforming to the LTO (Linear Tape Open) standards. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 2:
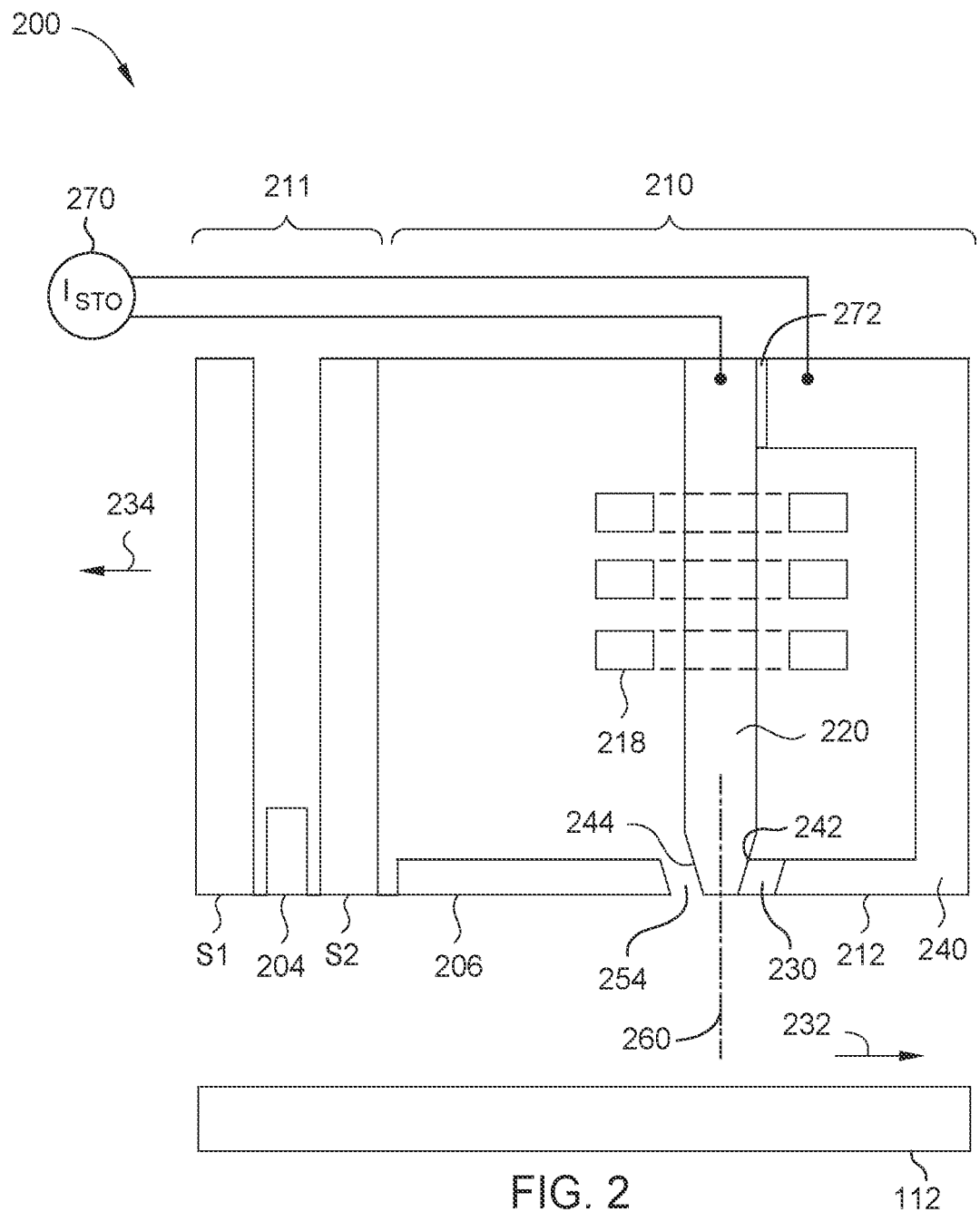
FIG. 2 is a fragmented, cross-sectional side view through the center of a read/write head facing a magnetic media, according to one embodiment.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head or a perpendicular magnetic recording (PMR) head. In FIG. 2, the magnetic media 112 moves past the write head 210 in the direction indicated by the arrow 232 and the read/write head 200 moves in the direction indicated by the arrow 234.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and an optional spintronic device 230 disposed between the main pole 220 and the TS 240. The main pole 220 serves as a first electrode. Each of the main pole 220, the spintronic device 230, the leading shield 206, and the trailing shield (TS) 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

In some embodiments, the optional spintronic device 230 is used and is positioned proximate the main pole 220 and reduces the coercive force of the magnetic recording medium, so that smaller writing fields can be used to record data. In such embodiments, an electron current is applied to spintronic device 230 from a current source 270 to produce a microwave field. The electron current may include direct current (DC) waveforms, pulsed DC waveforms, and/or pulsed current waveforms going to positive and negative voltages, or other suitable waveforms. In other embodiments, an electron current is applied to spintronic device 230 from a current source 270 to produce a high frequency alternating current (AC) field to the media.

In one embodiment, which can be combined with other embodiments, the spintronic device 230 is electrically coupled to the main pole 220 and the TS 240. The main pole 220 and the TS 240 are separated in an area by an insulating layer 272. The current source 270 may provide electron current to the spintronic device 230 through the main pole 220 and the TS 240. For direct current or pulsed current, the current source 270 may flow electron current from the main pole 220 through the spintronic device 230 to the TS 240 or may flow electron current from the TS 240 through the spintronic device 230 to the main pole 220 depending on the orientation of the spintronic device 230. In one embodiment, which can be combined with other embodiments, the spintronic device 230 is coupled to electrical leads providing an electron current other than from the main pole 220 and/or the TS 240.

Figure 3A:
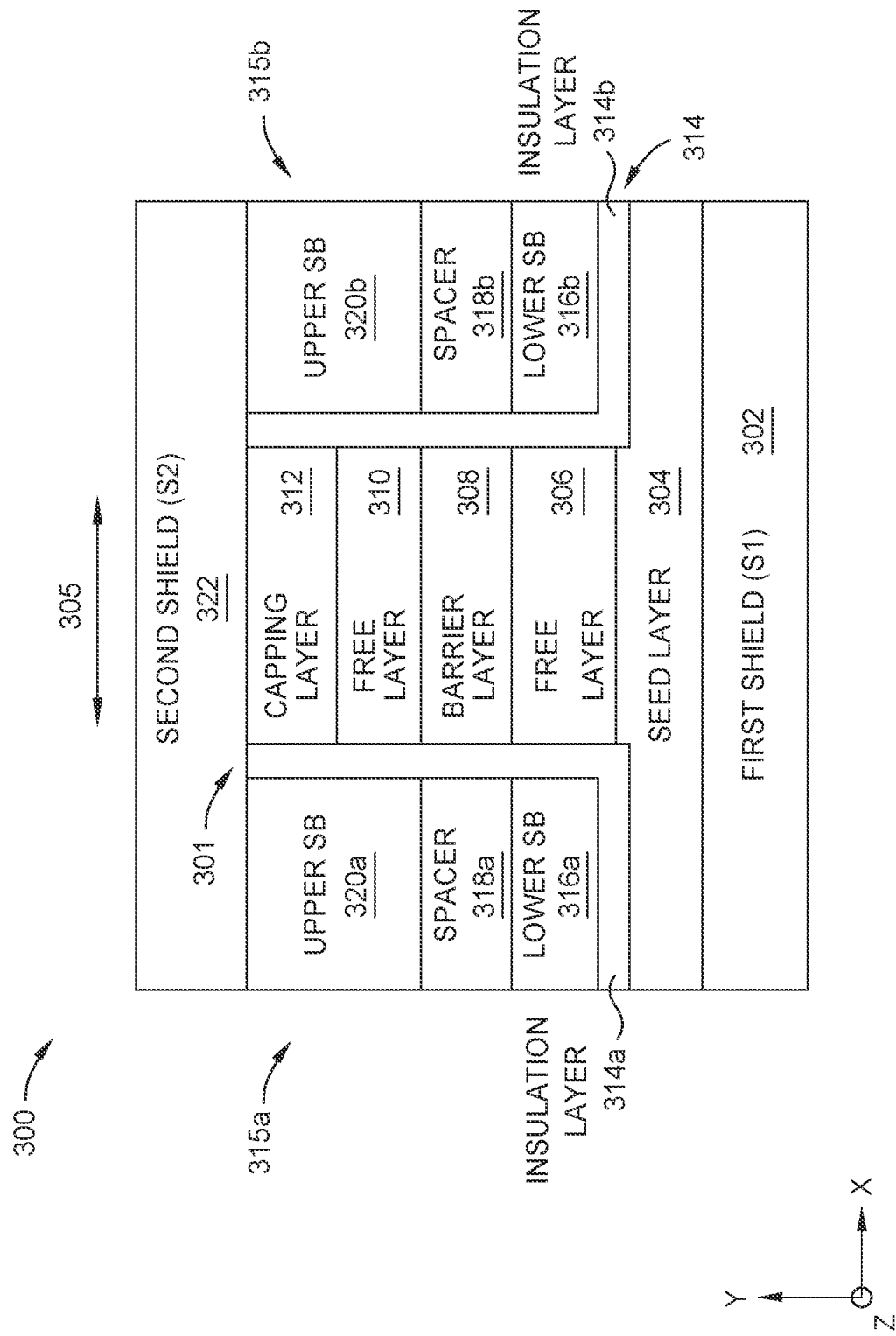
FIGS. 3A-3B illustrate a dual free layer (DFL) read head, according to one embodiment.
Figure 3B:
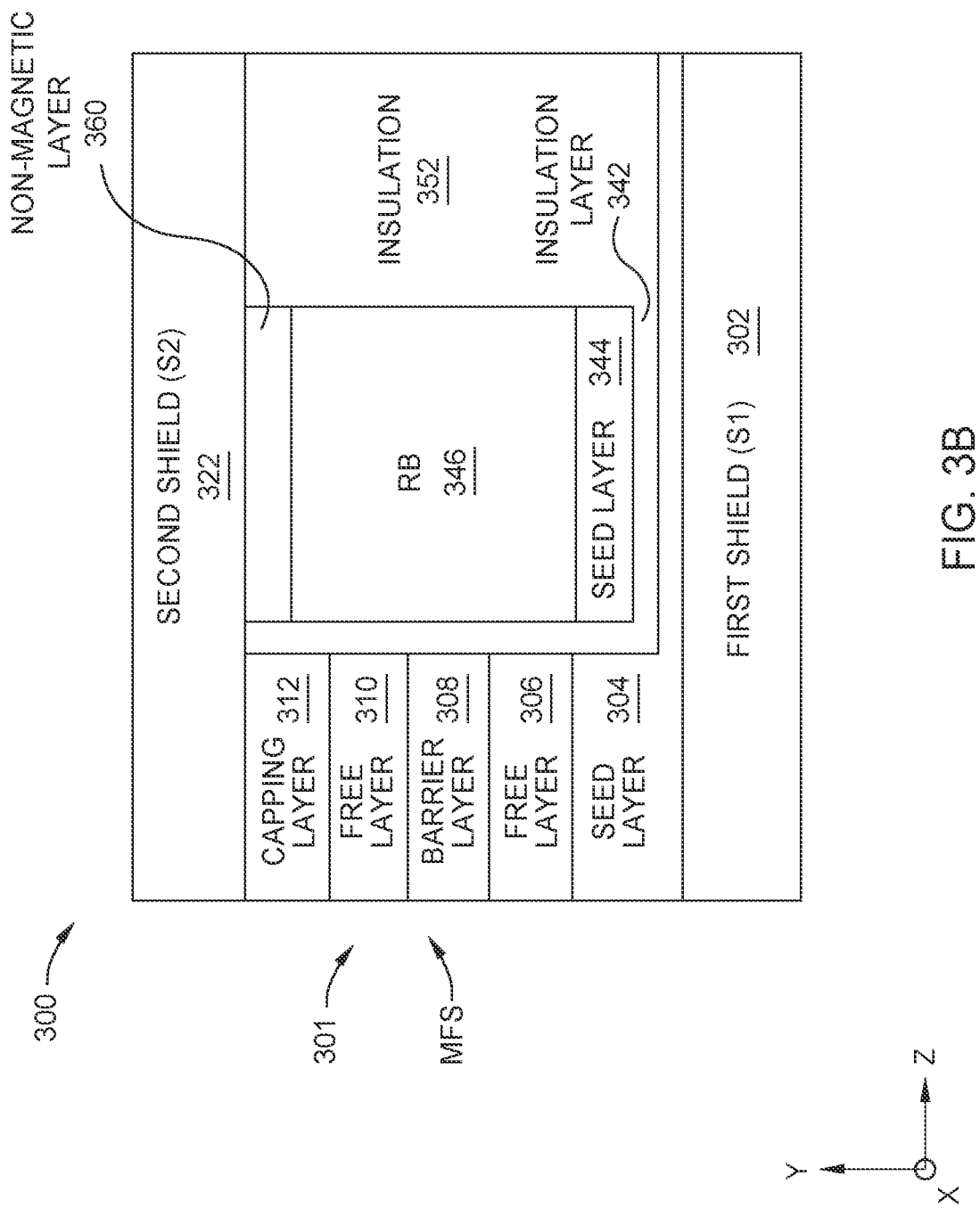

FIGS. 3A-3B illustrate a dual free layer (DFL) read head 300, according to one embodiment. FIG. 3A illustrates a media facing surface (MFS) view of the DFL read head 300, and FIG. 3B illustrates an APEX (i.e., a vertical cross-sectional) view of the DFL read head 300. The DFL read head 300 may correspond to, or be a part of, the magnetic head assembly 121 described in FIG. 1. The DFL read head 300 may correspond to, or be a part of, the read/write head 200 described in FIG. 2, such as the magnetic read head 211.

The DFL read head 300 may be formed as described below in FIGS. 4A-4C, and/or in FIGS. 5A-5E, and/or in FIGS. 6A-6D.

The DFL read head 300 includes a first shield (S1) 302, a seed layer 304, a first free layer (FL) 306, a barrier layer 308, a second FL 310, a capping layer 312, and a second shield (S2) 322. The seed layer 304, the first FL 306, the barrier layer 308, the second FL 310 and the capping layer 312 form a DFL read sensor 301 of the DFL read head 300. The DFL read sensor 301 may be a tunnel magneto resistance (TMR) sensor. The DFL read sensor 301 has a track width 305 in the x-direction of about 10 nm to about 30 nm±about 2 nm. The seed layer 304 includes a material selected from the group that includes tantalum (Ta), ruthenium (Ru), titanium (Ti), cobalt hafnium (CoHf), and combinations thereof. In one embodiment, the barrier layer 308 comprises MgO. The first FL 306 and the second FL 310 may each individually comprise cobalt iron (CoFe), cobalt boron (CoB), cobalt iron boron (CoFeB), cobalt hafnium (CoHf), cobalt iron hafnium (CoFeHf) and combinations thereof. The capping layer 312 may comprise Ta, Ru, Ti, CoHf, and combinations thereof.

The DFL read head 300 further includes a first synthetic antiferromagnetic (SAF) soft bias (SB) side shield 315a that includes a first lower SB layer 316a, a first spacer 318a such as ruthenium, and a first upper SB layer 320a and a second SAF SB side shield 315b that includes a second lower SB layer 316b, a second spacer 318b such as ruthenium, and a second upper SB layer 320b. The SAF SB layers 316a, 316b, 320a, 320b may comprise NiFe and/or CoFe and combinations thereof. The magnetic moments or magnetization directions for the first FL 306 and the second FL 310 may be antiparallel due to the antiparallel biasing from the SAF SB side shields 315a, 315b (collectively referred to as SAF SB side shields 315). The DFL read sensor 301 is insulated from SAF SB side shields 315 by insulation layers 314a, 314b (collectively referred to as insulation layers 314). The insulation layers 314 may be aluminum oxide (AlOx), magnesium oxide (MgO) or any other suitable insulation material, and combinations thereof.

As shown in FIG. 3B, the DFL read head 300 further includes a rear bias (RB) 346 and a second insulation layer 342. The RB 346 is isolated electrically by a second insulation layer 342 from the DFL read sensor 301 and the first shield 302. The second insulation layer 342 may be aluminum oxide (AlOx), magnesium oxide (MgO), any other suitable insulation material, and combinations thereof. A bottom portion of the RB 346 disposed adjacent to the first shield 302 is spaced from the second insulation layer 342 by a seed layer 344, where the seed layer 344 has a same width in the z-direction as the RB 346. The RB 346 is further insulated by the first insulation layer 352 on the other side away from the DFL read sensor 301 (e.g., recessed from the MFS). The first insulation layer 352 may be aluminum oxide (AlOx) or any other suitable insulation material. While not shown here, further details on additional insulation layers are described below starting with FIG. 4A. The RB 346 generates a magnetic field pointing away from the first insulation layer 352 and towards the following layers: the first FL 306, the barrier layer 308, the second FL 310, and the capping layer 312. The RB 346 is magnetically decoupled from the second shield 322 by inserting a nonmagnetic layer 360 between RB 346 and the second shield 322. The RB 346 may comprise CoPt, and in such cases, referred to as rear hard bias (RHB). The RB 346 may also comprise NiFe and/or CoFe and combinations thereof, and in such cases, referred to as rear soft bias (RSB). Generally, both the material of the RHB 346 and the material of the RSB 346 or the SAF SB side shields 315 are polycrystalline. As such, the granular nature of the material of the RB 346 determines the degree of the intrinsic non-uniformity of the transverse bias fields depending on its magneto-crystalline anisotropy.

The RB 346 has a magnetization direction (e.g., in the z-direction) perpendicular to a magnetization direction (e.g., in the x-direction) of the first FL 306 and the second FL 310. Before the magnetic recording head comprising the DFL read head 300 is shipped from the production line, the RB 346 typically needs to be magnetically initialized by a magnetic field in the z-direction.

In some embodiments, the DFL read head 300 may be part of a two dimensional magnetic recording (TDMR) read head, comprising a lower reader and an upper reader. In some embodiments, the lower reader and the upper reader are the same, having the structure as substantially shown in FIGS. 3A-3B. For example, the TDMR read head may comprise a second DFL read head disposed over the second shield 322.

FIGS. 4A-6D illustrate various initial stages of a method of forming a DFL read head 400, in accordance with one or more embodiments of the present disclosure. FIGS. 4A-4D illustrate cross-section views of the DFL read head 400. FIGS. 5A-5D illustrate top views of the DFL read head 400, where FIG. 5A corresponds to FIG. 4A, FIG. 5B corresponds to FIG. 4B, FIG. 5C corresponds to FIG. 4C, and FIG. 5D corresponds to FIG. 4D. FIGS. 6A-6D illustrate MFS views of the DFL read head 400, where FIG. 6A corresponds to FIGS. 4A and 5A, FIG. 6B corresponds to FIGS. 4B and 5B, FIG. 6C corresponds to FIGS. 4C and 5C, and FIG. 6D corresponds to FIGS. 4D and 5D. In some embodiments, the DFL read head 400 may be a DFL TDMR read head, comprising a lower reader and an upper reader, like described above. In such an embodiment, the method described below would be repeated a second time to form a second read head over the first read head.

The DFL read head 400 may be the DFL read head 300 of FIGS. 3A-3B. As such, the DFL sensor 401 may be the DFL sensor 301, the seed layer 404 may be the seed layer 304, the RHB 446 may be the RB 346, the insulation layer 442 may be the second insulation layer 342, and the non-magnetic layer 460 may be the nonmagnetic layer 360. The DFL read head 400 may correspond to, or be a part of, the magnetic head assembly 121 described in FIG. 1. The DFL read head 400 may correspond to, or be a part of, the read/write head 200 described in FIG. 2, such as the magnetic read head 211. The DFL sensor 401 may be a TMR sensor.

FIGS. 4A, 5A, and 6A illustrate the DFL read head 400 after the DFL sensor 401 and the RHB 446 have been formed on the seed layer 404. The nonmagnetic layer 460 is deposited on the RHB 446, the SAF SB side shields 315 are deposited adjacent to the DFL sensor 401 at the MFS, and a bias layer 430 is deposited on the DFL sensor 401. The bias layer 430 comprises a magnetic material, such as NiFe. With respect to FIGS. 3A-3B, the bias layer 430 is not shown, but is disposed between the second shield 322 and the upper SBs 320a, 320b. The nonmagnetic layer 460 may comprise Ta or Ru, for example.

FIGS. 4B, 5B, and 6B illustrate a first photoresist 432 being deposited over the nonmagnetic layer 460, the SAF SB side shields 315, and the bias layer 430. A second photoresist 434 is then deposited over a portion of the first photoresist 432. The size of the second photoresist 434 is determined based on a desired size or area in the z-direction of the RHB 446, the nonmagnetic layer 460, DFL sensor 401, the SAF SB side shields 315, and the bias layer 430. The second photoresist 434 is large enough to cover the DFL sensor 401, as shown in FIG. 6B.

FIGS. 4C, 5C, and 6C illustrate removing a portion of the first photoresist 432 such that the first photoresist 432 has the same size as the second photoresist 434. A reactive ion etch (RIE) process may be used to remove the exposed portion of the first photoresist 432. FIGS. 4D, 5D, and 6D illustrate etching away a portion of the RHB 446, the nonmagnetic layer 460, the SAF SB side shields 315, and the bias layer 430 to the desired size. In some embodiments, a portion of the seed layer 404 and the insulation layer 442 are also removed.

FIGS. 7A-8D illustrate various stages of the method of forming the DFL read head 400 continued from FIGS. 4D, 5D, and 6D, in accordance with one or more embodiments of the present disclosure. FIGS. 7A-7D illustrate cross-section views of the DFL read head 400. FIGS. 8A-8D illustrate MFS views of the DFL read head 400, where FIG. 8A corresponds to FIG. 7A, FIG. 8B corresponds to FIG. 7B, FIG. 8C corresponds to FIG. 7C, and FIG. 8D corresponds to FIG. 7D.

Figure 7A:
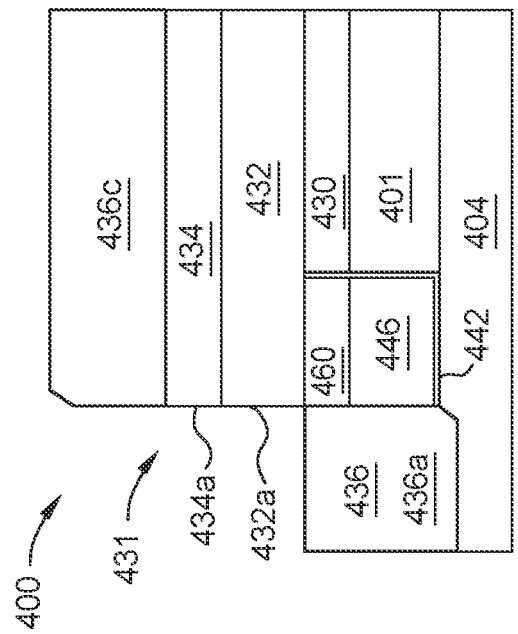
FIGS. 7A-7D illustrate cross-sectional views of various stages of the method of forming the DFL read head continued from FIGS. 4D, 5D, and 6D, in accordance with one or more embodiments of the present disclosure.

As shown in FIGS. 7A and 8A, a refill layer 436 is disposed on the seed layer 404 and the second photoresist 434. A first portion 436a of the refill layer 436 is disposed on in contact with RHB 446, the nonmagnetic layer 460, and the seed layer 404. The first portion 436a may have a height in the y-direction substantially equal to a combined height of the RHB 446 and the nonmagnetic layer 460. A second portion 436b of the refill layer 436 is disposed on sidewalls 431 of the DFL read head 400 such that the second portion 436b is disposed in contact with surfaces 432a, 432b, 432c of the first photoresist 432 and surfaces 434a, 434b, 434c of the second photoresist 434. A third portion 436c of the refill layer 436 is disposed on a top surface of the second photoresist 434. The second portion 436b connects the first and third portions 436a, 436c. The refill layer 436 may comprise AlOx, MgOx, and/or SiNx, where x is an integer greater than or equal to 1, for example. The refill layer 436 may surround the entire DFL read head 400 as shown in the figures.

Figure 7B:
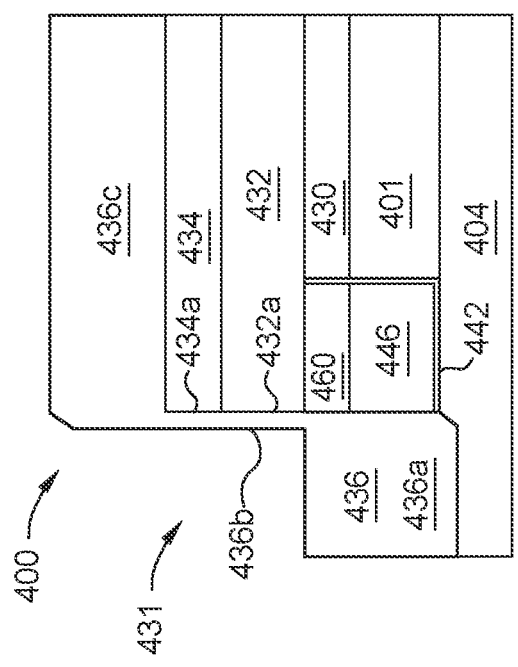

In FIGS. 7B and 8B, the second portion 436b of the refill layer 436 disposed on the sidewalls 431 is removed. Removing the second portion 436b exposes the surfaces 432a-432c, 434a-434c of the first and second photoresists 432, 434, and further prepares for the lift off or removal of the first and second photoresists 432, 434.

Figure 7D:
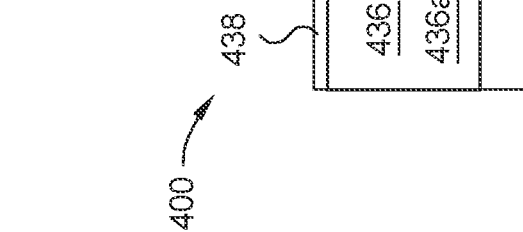
Figure 7C:
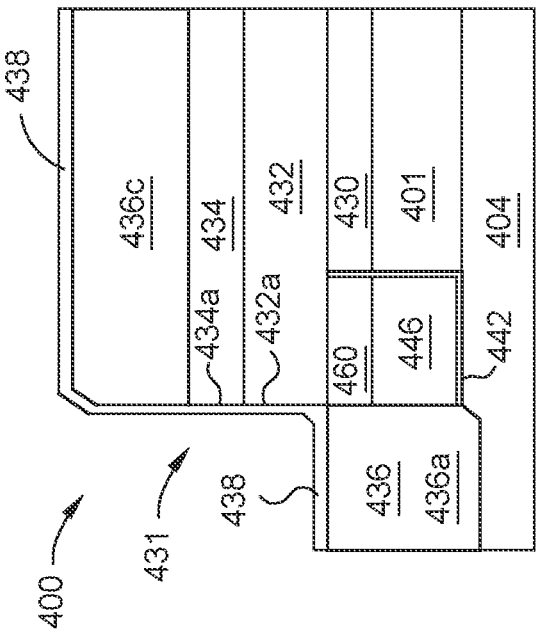

FIGS. 7C and 8C illustrate an insulating cap layer 438 being deposited on the first and third portions 436a, 436c of the refill layer 436 and the exposed sidewalls 431. The cap layer 438 may act as a chemical mechanical polishing (CMP) stop layer. As such, the cap layer 438 will protect the refill layer 436 from being etched or removed in a later process. The cap layer 438 comprises an insulating material, such as $SiO_2$. The cap layer 438 may have a thickness in the y-direction of about 1 nm to about 5 nm, such as about 2 nm. The refill layer 436 and the cap layer 438 have a combined height in the y-direction substantially equal to a combined height of the RHB 446 and the nonmagnetic layer 460.

FIGS. 7D and 8D illustrate lifting off or removing the first and second photoresists 432, 434, as well as the third portion 436c of the refill layer and the portion of the cap layer 438 disposed on the third portion 436c. Upon removing the first and second photoresists, the first portion 436a of the refill layer 436 and the cap layer 438 disposed on the first portion 436a remain. Furthermore, the nonmagnetic layer 460, the SAF SB side shields 315, and the bias layer 430 are once again exposed.

Upon removing the first and second photoresists 432, 434, the exposed top surfaces of the DFL read head 400 (i.e., the cap layer 438, the nonmagnetic layer 460, the SAF SB side shields 315, and the bias layer 430) may be smoothed out by a CMP process to flatten or smooth out the surface topography. The CMP process removes fences or bumps that may remain at the edges of where the first and second photoresists 432, 434 previously were. The cap layer 438 protects the refill layer 436 during the CMP process to prevent removing any portions of the refill layer 436. The cap layer 438 can be considered part of the refill layer 436, and remains in the DFL read head 400. As such, the cap layer 438 does not need to be removed. Furthermore, because the cap layer 438 does not comprise a metal, the possibility of shorting the DFL read head 400 due to left over metal residue is eliminated.

FIGS. 9A-10E illustrate various stages of the method of forming an electrical lapping guide (ELG) 900 of a read/write head, in accordance with one or more embodiments of the present disclosure. FIGS. 9A-9I illustrate cross-section views of the ELG 900. FIGS. 10A-10E illustrate top views of the ELG 900, where FIG. 10A corresponds to FIG. 9A, FIG. 10B corresponds to FIG. 9B, FIG. 10C corresponds to FIG. 9C, FIG. 10D corresponds to FIG. 9D, and FIG. 10E corresponds to FIG. 9I. The ELG 900 may be a part of the magnetic head assembly 121 described in FIG. 1. The ELG 900 may be a part of the read/write head 200 described in FIG. 2, such as the magnetic read head 211. The ELG 900 depicted in FIGS. 9A-9I is adjacent to the DFL read head 400 of FIGS. 4A-8D in the x-direction. The ELG 900 may be referred to as a reader ELG (RELG), and controls the lapping process at a back end of the DFL read head 400.

In FIGS. 9A and 10A, a first cap layer 938 is deposited on a metal layer 960, the metal layer 960 being disposed on a first insulating layer 936. The first insulating layer 936 may comprise AlOx, MgOx, and/or SiNx, where x is an integer greater than or equal to 1. The metal layer 960 may comprise Ta, Ru, or a combination thereof. The first cap layer 938 may comprise SiOx, where x is an integer greater than or equal to 1. In TDMR read heads, the first insulating layer 936 may be the refill layer 436 of FIGS. 7A-8D.

In FIGS. 9B and 10B, a first photoresist 932 is disposed on the first cap layer 938, and a second photoresist 934 is disposed on the first photoresist 932. The second photoresist 934 is then patterned such that portions of the second photoresist 934 are removed to create one or more vias 964a, 964b and the first photoresist 932 is exposed. A RIE process may be used to remove the portions of the second photoresist 934. In FIGS. 9C and 10C, the exposed portions of the first photoresist 932 disposed in the vias 964a, 964b are removed to expose portions of the first cap layer 938. A RIE process may be used to remove the portions of the first photoresist 932. In FIGS. 9D and 10D, the exposed portions of the first cap layer 938 disposed in the vias 964a, 964b and portions of the metal layer 960 disposed in the vias 964a, 964b are removed, such as by milling, to expose the first insulating layer 936.

In FIG. 9E, a second insulating layer 940 is deposited over the first and second photoresists 932, 934 and on the first insulating layer 936 exposed in the vias 964a, 964b. The second insulating layer 940 has a thickness in the y-direction of about 40 nm to about 50 nm, such as about 45 nm. The second insulating layer 940 has a thickness in the y-direction substantially equal to a combined thickness of the metal layer 960 and the first cap layer 938. The second insulating layer 940 is disposed on the sidewalls 966 of the vias 964a, 964b. The second insulating layer 940 may comprise the same material as the first insulating layer 936, such as AlOx, MgOx, and/or SiNx, where x is an integer greater than or equal to 1.

In FIG. 9F, the portion of the second insulating layer 940 disposed on the sidewalls 966 of the vias 964a, 964b is removed to facilitate lift off or removal of the first and second photoresists 932, 934. Additionally, a second cap layer 962 is deposited over the second insulating layer 940 and on the sidewalls 966 of the vias 964a, 964b. The second cap layer 962 has a thickness less than or equal to about 4 nm.

In FIG. 9G, the first and second photoresists 932, 934 are removed, along with the portion of the second insulating layer 940 disposed on the second photoresist 934 and the portion of the second cap layer 962 disposed on the sidewalls 966 of the vias 964a, 964b.

In FIG. 9H, upon removing the first and second photoresists 932, 934, a top surface 901 of the ELG 900 is smoothed out by a CMP process to flatten or smooth out the surface topography. The CMP process removes fences or bumps that may remain at the edges of where the first and second photoresists 932, 934 previously were. The second cap layer 962 protects the second insulating layer 940 during the CMP process to prevent removing any portions of the second insulating layer 940. The second cap layer 962 can be considered part of the second insulating layer 940, and remains in the DFL read head 400. As such, the second cap layer 962 does not need to be removed. Furthermore, because the second cap layer 962 does not comprise a metal, the possibility of shorting the DFL read head 400 due to left over metal residue is eliminated. FIGS. 9I and 10E, a portion of the ELG 900 is lapped or removed to define the MFS. The remaining portions of the ELG 900 after lapping are disposed adjacent to the DFL read head 400 of FIGS. 4A-8D in the x-direction.

Therefore, by using a non-metal or insulating material, such as SiOx, as a cap layer, the cap layer is able to protect refill or insulating layers from being removed by acting as a CMP stop layer. Moreover, the non-metal cap layer may remain within the final DFL read head without the possibility of shorting the DFL read head during operation.

In one embodiment, a read head comprises a dual free layer (DFL) sensor having a first surface disposed at a media facing surface (MFS), a second surface opposite the first surface, a third surface adjacent to the first surface, and a fourth side opposite the third surface, a rear hard bias (RHB) structure having a first surface disposed adjacent to the second surface of the DFL sensor, a second surface opposite the first surface, a third surface aligned with a third surface of the DFL sensor, and a fourth surface aligned with the fourth surface of the DFL sensor, a nonmagnetic layer disposed on the RHB structure, an insulating layer disposed around the second, third, and fourth surfaces of the RHB structure, and around the second and third surfaces of the DFL sensor, and a SiOx cap layer disposed on the insulating layer, where x is an integer greater than or equal to 1.

The insulating layer and the SiOx cap layer have a combined height substantially equal to a combined height of the RHB structure and the nonmagnetic layer, the height being along the direction of the first and second surfaces of the RHB structure. The SiOx cap layer has a thickness less than or equal to about 2 nm. The insulating layer comprises AlOx, MgOx, SiNx, where x is an integer greater than or equal to 1, or a combination thereof, and wherein the nonmagnetic layer comprises Ta, Ru, or a combination thereof. A top surface of the read head is substantially flat, the top surface of the read head connecting the first, second, third, and fourth surfaces of DFL sensor and the first, second, third, and fourth surfaces of the RHB structure. At least a portion of an electrical lapping guide is disposed adjacent to the read head. A magnetic recording device comprises the read head.

In another embodiment, a method of forming a read head comprises forming a dual free layer (DFL) sensor and a rear hard bias (RHB) structure on a seed layer, the DFL sensor being disposed at a media facing surface (MFS) and the RHB structure being recessed from the MFS, wherein the RHB structure comprises a nonmagnetic cap layer, depositing a photoresist on the DFL read head and the RHB structure, depositing a refill layer on the photoresist and on the seed layer adjacent to the DFL sensor and the RHB structure, the refill layer being deposited on one or more sidewalls of the photoresist, removing portions of the refill layer disposed on the one or more sidewalls, depositing a SiOx cap layer, where x is an integer greater than or equal to 1, on the refill layer and on the one or more sidewalls, removing the photoresist, and planarizing the SiOx cap layer and top surfaces of the DFL sensor and the RHB structure.

Planarizing the SiOx cap layer and the top surfaces of the DFL sensor and RHB structure comprises flattening a topography of the read head. The DFL sensor is a tunnel magneto resistance (TMR) sensor. The SiOx cap layer is stop layer for the refill layer. The refill layer comprises AlOx, MgOx, SiNx, where x is an integer greater than or equal to 1, or a combination thereof. The nonmagnetic cap layer comprises Ru, Ta, or a combination thereof. The method further comprises removing portions of the photoresist prior to depositing the refill layer to define an area of the RHB structure and the DFL sensor. At least a portion of an electrical lapping guide is disposed adjacent to the read head. A magnetic recording device comprises the read head formed by the method.

In yet another embodiment, a method of forming an electrical lapping guide adjacent to a read head comprises depositing a first insulating layer, depositing a metal layer on the first insulating layer, depositing a first SiOx cap layer, where x is an integer greater than or equal to 1, on the metal layer, depositing a photoresist on the first SiOx cap layer, creating one or more vias in the photoresist, removing portions of the first SiOx cap layer and the metal layer disposed in the one or more vias to expose one or more portions of the first insulating layer, depositing a second insulating layer on the photoresist and the exposed portions of the first insulating layer, the second insulating layer being deposited on sidewalls of the one or more vias, removing portions of the second insulating layer disposed on the sidewalls of the one or more vias, depositing a second SiOx layer, where x is an integer greater than or equal to 1, on the second insulating layer and on the sidewalls of the one or more vias, and removing the photoresist to expose the first SiOx cap layer.

The method further comprises planarizing the first and second SiOx cap layers to form a substantially flat topography. The first and second insulating layers each individually comprise AlOx, MgOx, SiNx, where x is an integer greater than or equal to 1, or a combination thereof, and wherein the metal layer comprises Ru, Ta, or a combination thereof. The second insulating layer has a thickness substantially equal to a combined thickness of the metal layer and the first SiOx cap layer. The second insulating layer has a thickness of about 40 nm to about 50 nm, and the second SiOx layer has a thickness less than or equal to about 4 nm. A magnetic recording device comprises the electrical lapping guide formed by the method.

While the foregoing is directed to embodiments of the present disclosure, other and further embodiments of the disclosure may be devised without departing from the basic scope thereof, and the scope thereof is determined by the claims that follow.

What is claimed is:

1. A read head, comprising:
a dual free layer (DFL) sensor having a first surface disposed at a media facing surface (MFS), a second surface opposite the first surface, a third surface adjacent to the first surface, and a fourth surface opposite the third surface, read head further sensor comprising a first soft bias side shield disposed adjacent to the third surface and a second soft bias side shield disposed adjacent to the fourth surface;
a rear hard bias (RHB) structure having a first surface disposed adjacent to the second surface of the DFL sensor, a second surface opposite the first surface, a third surface aligned with the third surface of the DFL sensor, and a fourth surface aligned with the fourth surface of the DFL sensor;
a nonmagnetic layer disposed on the RHB structure;
an insulating layer disposed around the second, third, and fourth surfaces of the RHB structure, and around the third and fourth surfaces of the DFL sensor; and
a SiOx cap layer disposed on the insulating layer, where x is an integer greater than or equal to 1, the SiOx cap layer being disposed adjacent to the first and second soft bias side shields and the RHB structure, and extending to the MFS.

2. The read head of claim 1, wherein the insulating layer and the SiOx cap layer have a combined height substantially equal to a combined height of the RHB structure and the nonmagnetic layer, the height being along the direction of the first and second surfaces of the RHB structure.

3. The read head of claim 1, wherein the SiOx cap layer has a thickness less than or equal to about 2 nm.

4. The read head of claim 1, wherein the insulating layer comprises AlOx, MgOx, SiNx, where x is an integer greater than or equal to 1, or a combination thereof, and wherein the nonmagnetic layer comprises Ta, Ru, or a combination thereof.

5. The read head of claim 1, wherein a top surface of the read head is substantially flat, the top surface of the read head connecting the first, second, third, and fourth surfaces of DFL sensor and the first, second, third, and fourth surfaces of the RHB structure.

6. The read head of claim 1, wherein at least a portion of an electrical lapping guide is disposed adjacent to the read head.

7. A magnetic recording device comprising the read head of claim 1.

8. A read head, comprising:
a dual free layer (DFL) sensor having a first surface disposed at a media facing surface (MFS), a second surface opposite the first surface, a third surface adjacent to the first surface, a fourth surface opposite the third surface, a top surface, and a bottom surface opposite the top surface, wherein the read head further comprises a first soft bias side shield disposed adjacent to the third surface and a second soft bias side shield disposed adjacent to the fourth surface;
a rear hard bias (RHB) structure having a first surface disposed adjacent to the second surface of the DFL sensor, a second surface opposite the first surface, a third surface aligned with the third surface of the DFL sensor, a fourth surface aligned with the fourth surface of the DFL sensor, a top surface, and a bottom surface opposite the top surface;
a nonmagnetic layer disposed on the top surface of the RHB structure;
an insulating layer disposed around the second, third, and fourth surfaces of the RHB structure, and around the third and fourth surfaces of the DFL sensor; and
a SiOx cap layer disposed on the insulating layer, where x is an integer greater than or equal to 1, the SiOx cap layer being disposed adjacent to the top surface of the DFL sensor and the top surface of the RHB structure, and extending to the MFS.

9. The read head of claim 8, wherein the insulating layer and the SiOx cap layer have a combined height substantially equal to a combined height of the RHB structure and the nonmagnetic layer, the height being along the direction of the first and second surfaces of the RHB structure.

10. The read head of claim 8, wherein the SiOx cap layer has a thickness less than or equal to about 2 nm.

11. The read head of claim 8, wherein the insulating layer comprises AlOx, MgOx, SiNx, where x is an integer greater than or equal to 1, or a combination thereof, and wherein the nonmagnetic layer comprises Ta, Ru, or a combination thereof.

12. The read head of claim 8, wherein at least a portion of an electrical lapping guide is disposed adjacent to the read head.

13. A magnetic recording device comprising the read head of claim 8.

14. A read head, comprising:
a dual free layer (DFL) sensor having a first surface disposed at a media facing surface (MFS), a second surface opposite the first surface, a third surface adjacent to the first surface, and a fourth surface opposite the third surface, the read head further comprising a first soft bias side shield disposed adjacent to the third surface and a second soft bias side shield disposed adjacent to the fourth surface;
a rear hard bias (RHB) structure having a first surface disposed adjacent to the second surface of the DFL sensor;
a nonmagnetic layer disposed on the RHB structure;
an insulating layer disposed around an outer perimeter of the RHB structure and the third and fourth surfaces of the DFL sensor; and
a SiOx cap layer disposed on the insulating layer, where x is an integer greater than or equal to 1, the SiOx cap layer being disposed around the outer perimeter of the RHB structure and the third and fourth surfaces of the DFL sensor, and extending to the MFS.

15. The read head of claim 14, wherein the insulating layer and the SiOx cap layer have a combined height substantially equal to a combined height of the RHB structure and the nonmagnetic layer, the height being along the direction of the first surface of the RHB structure.

16. The read head of claim 14, wherein the SiOx cap layer has a thickness less than or equal to about 2 nm.

17. The read head of claim 14, wherein the insulating layer comprises AlOx, MgOx, SiNx, where x is an integer greater than or equal to 1, or a combination thereof, and wherein the nonmagnetic layer comprises Ta, Ru, or a combination thereof.

18. The read head of claim 14, wherein at least a portion of an electrical lapping guide is disposed adjacent to the read head.

19. A magnetic recording device comprising the read head of claim 14.

* * * * *